US006553301B1

(12) United States Patent
Chhaya et al.

(10) Patent No.: US 6,553,301 B1
(45) Date of Patent: Apr. 22, 2003

(54) SYSTEM AND METHOD OF PROVIDING OPTIMAL FUEL ECONOMY FOR AUTOMOBILES

(75) Inventors: Sunil M. Chhaya, Troy, MI (US); Gregory M. Major, Beverly Hills, MI (US); George M. Claypole, Fenton, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/574,485

(22) Filed: May 19, 2000

(51) Int. Cl.$^7$ ............................................... B60K 41/04
(52) U.S. Cl. ............................ 701/54; 701/55; 701/59
(58) Field of Search ............................ 701/54, 55, 56, 701/58, 59

(56) References Cited

U.S. PATENT DOCUMENTS 4,919,096 A * 4/1990 Manaka et al. ............. 123/399
5,089,963 A * 2/1992 Takahashi ................. 364/424.1
5,396,420 A * 3/1995 Graf ......................... 364/424.1
5,754,428 A * 5/1998 Ishikawa ................... 364/424.1
5,878,364 A * 3/1999 Kuroda et al. ................ 701/56
6,006,151 A * 12/1999 Graf ............................. 701/57
6,021,369 A * 2/2000 Kamihira et al. ........... 701/102
6,038,505 A * 3/2000 Probst et al. .................. 701/65
6,188,945 B1 * 2/2001 Graf et al. ..................... 701/58

FOREIGN PATENT DOCUMENTS

EP                 0194799 A2  *  9/1986

* cited by examiner

*Primary Examiner*—Michael J. Zanelli
*Assistant Examiner*—Eric M Gibson
(74) *Attorney, Agent, or Firm*—Christopher DeVries

(57) ABSTRACT

A system and method of optimizing fuel economy for an automobile is provided. Driver torque request input data is received and is accumulated over a period of time to generate accumulated torque request data. Torque data is extracted from the accumulated torque request data. The torque data is processed to generate driver habit data from the torque data. The driver habit data is stored and used to optimize fuel economy.

24 Claims, 8 Drawing Sheets

SYSTEM AND METHOD OF PROVIDING OPTIMAL FUEL ECONOMY FOR AUTOMOBILES

FIELD OF THE INVENTION

This invention relates generally to the field of automobiles, and in particular, to a system and method of providing optimal fuel economy for automobiles by automatically adjusting the operation of the powertrain based on the driving habits of the driver.

BACKGROUND OF THE INVENTION

Pollutants generated by automobiles, and their effect on the environment, has been and continues to be an important public policy issue. In fact, stringent emissions requirements have been enacted by the Environmental Protection Agency (EPA) to force automobile manufacturers to increase the fuel economy and thereby reduce emissions generate by their automobiles. For example, the EPA requires all automobile manufacturers to comply with its Corporate Average Fuel Economy (C.A.F.E.) standard. Also, manufacturers are required to disclose to the public the fuel economy rating for each of its automobiles as governed by the Society of Automotive Engineers (SAE) Federal Test Procedure (FTP).

As the number of automobiles on the roadways continues to increase in the future, emissions standards will become even more stringent. As a result, automobile manufactures have been continuously attempting to increase fuel efficiency and reduce emissions of their automobiles. Automobile manufacturers have traditionally attempted to accomplish this by utilizing lighter materials such as, for example, aluminum instead of steel. They also have attempted to design and build higher efficiency engines and improved catalytic converters. However, these traditional approaches to improved fuel economy and reduced emissions each require significant development costs which in turn increases the overall cost of the vehicle considerably. Moreover, the significant investment that is typically required for improved engines, catalytic converters, and lightweight materials only provide marginal returns in terms of improving efficiency and lowering emissions.

Automobile manufacturers have also attempted to increase the fuel economy of conventional vehicles by implementing a shift schedule for the transmission that provides the most desirable blend of performance and fuel economy. However, conventional control algorithms used to generate the shift schedule for a particular vehicle is "fixed" by the manufacturer in manner that optimizes fuel economy and emissions for a given FTP test schedule. As a result, there is no way for these conventional control algorithms to adapt to the specific driving habits of a particular driver. The shift schedule therefore cannot be modified to match the driving habits of a particular driver to maximize the fuel economy for that particular driver. For example, the fuel economy for a vehicle cannot be maximized if the driver happens to be more aggressive than the programmed shift schedule set by the manufacturer, who usually sets the shift schedule to maximize fuel economy pursuant to a given FTP test schedule.

Accordingly, it would be desirable to have a system and method for optimizing the fuel economy for automobiles that overcomes the disadvantages described above under all types of driving conditions.

SUMMARY OF THE INVENTION

One aspect of the invention provides a method of optimizing fuel economy for an automobile. Driver torque request input data is received and is accumulated over a period of time to generate accumulated torque request data. Relevant or significant torque data is extracted from the accumulated torque request data. The relevant or significant torque data is processed to generate driver habit data from the torque data. The driver habit data is used to optimize fuel economy. A second driver torque request input data may preferably be received, and the driver habit data may be combined with the second driver torque input data to generate powertrain commands to optimize fuel economy. The driver torque request input data may preferably include an accelerator and brake torque request data. An accelerator and brake torque request history may preferably be determined. A rate of change of torque may also be determined. The driver torque request input data may preferably be accumulated over a period of thirty seconds or other predetermined period of time. A running average of torque may preferably be determined, and a torque histogram may preferably be generated. A slope of the torque histogram may preferably be determined. The habit data may preferably be stored as a preset for a particular driver. A driver identification may preferably be received. The powertrain commands for a conventional automobile may preferably include transmission commands and engine commands. The powertrain commands for a hybrid-electric vehicle may preferably include transmission commands, engine commands, and electric motor commands. A transmission including a plurality of gears may preferably be provided, and an optimal gear from the plurality of gears for the transmission may preferably be determined. An engine may preferably be provided, and an optimal torque for the engine may preferably be determined. An engine and an electric drive may be provided. In the context of a hybrid-electric automobile, an optimal torque for the engine and for the electric drive may preferably be determined. An optimal shift schedule may preferably be determined along with a battery charging torque for the engine. On/Off times for the engine may also be determined. An accelerator pedal may preferably be depressed to create the driver acceleration torque request input data.

Another aspect of the invention provides a system for optimizing fuel economy of an automobile. Computer readable program code receives driver torque request input data and accumulates the driver torque request input data to generate accumulated torque request data. Computer readable program code extracts relevant or significant torque data from the accumulated torque request data and processes the torque data to generate driver habit data from the torque data. Computer readable program code stores the driver habit data to optimize fuel economy. Computer readable program code may also preferably receive a second driver torque request input data and combine the driver habit data with the second driver torque request input data to generate powertrain commands to optimize fuel economy.

Another aspect of the invention provides a program for optimizing fuel economy of an automobile. Computer readable program code receives driver torque request input data and accumulates the driver torque request input data to generate accumulated torque request data. Computer readable program code extracts relevant or significant torque data from the accumulated torque request data and processes the relevant or significant torque data to generate driver habit data from the torque data. Computer readable program code stores and uses the driver habit data to optimize fuel economy. Computer readable program code may preferably receive a second driver torque request input data and may preferably combine the driver habit data with the second driver torque request input data to generate powertrain commands to optimize fuel economy and reduce emissions.

The invention provides the foregoing and other features, and the advantages of the invention will become further apparent from the following detailed description of the presently preferred embodiments, read in conjunction with the accompanying drawings. The detailed description and drawings are merely illustrative of the invention and do not limit the scope of the invention, which is defined by the appended claims and equivalents thereof.

DETAILED DESCRIPTION OF THE PRESENTLY PREFERRED EMBODIMENTS

Figure 1:
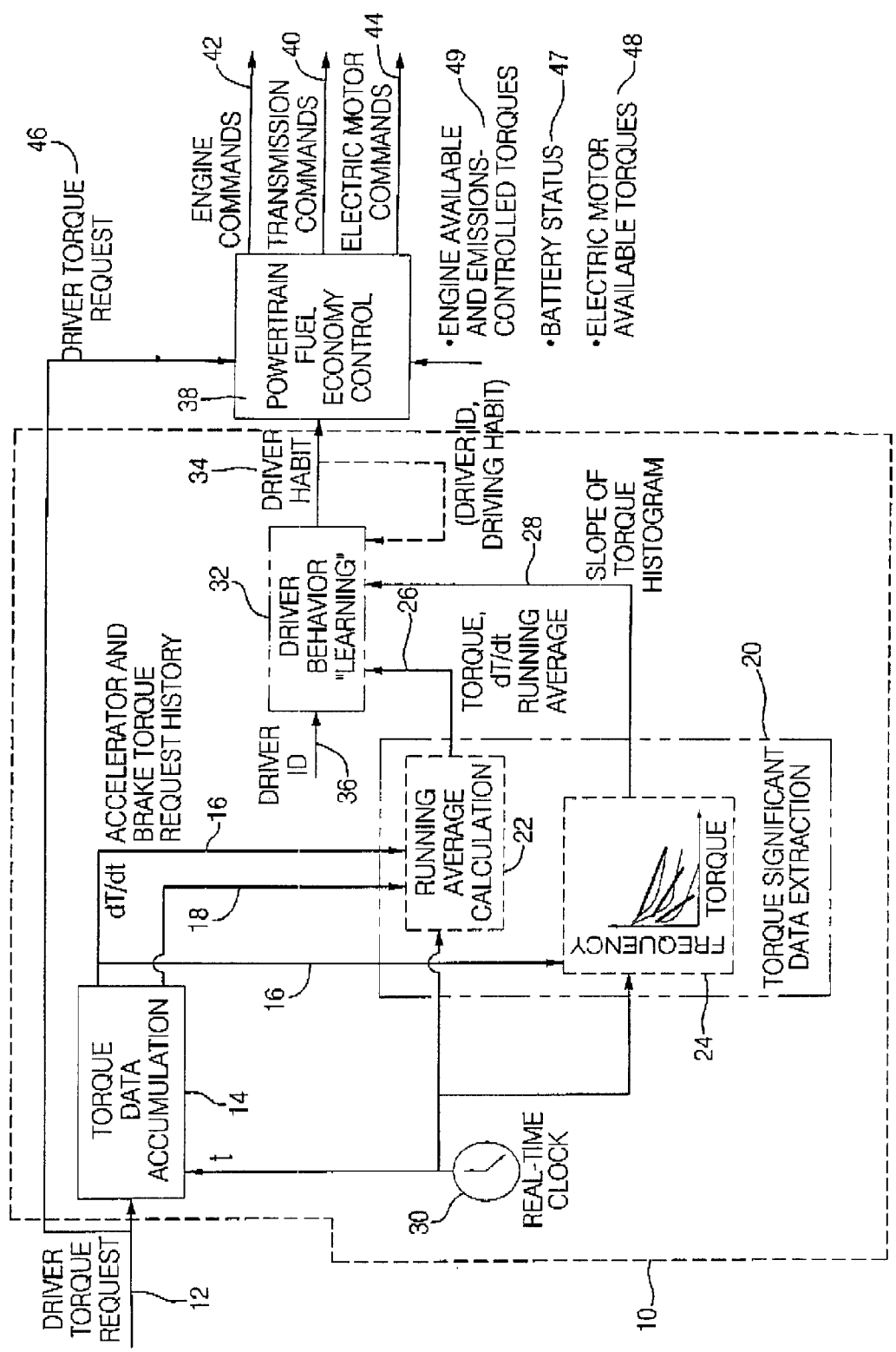
FIG. 1 is a schematic block diagram of a preferred embodiment of a system for providing optimal fuel economy for an automobile that is made in accordance with the invention.

FIG. 1 is a block diagram that illustrates an embodiment of a system 10 for providing optimal fuel economy for an automobile. The system 10 may be implemented in conventional automobiles as well as hybrid-electric automobiles. A conventional automobile has an internal combustion engine (that is matched to a transmission) as its sole power source. A hybrid-electric automobile may have a number of sources of power (such as an engine and an electric motor) and a number of sources of energy (such as gasoline and batteries that provide electricity). In hybrid-electric automobiles, there is typically one primary source of energy. For example, the most widely popular hybrid automobiles have gasoline as the primary source of energy and batteries as the secondary source of energy. The hybrid-electric automobile may be a "series" type or a "parallel" type depending upon how the power and energy sources interact and connect to the wheels.

The system 10 continuously and automatically "learns" a particular driver's driving behavior and stores this information in the system 10. The system 10 "learns" by continuously monitoring the torque requests (i.e. acceleration and braking) of the driver over a period of time. The system 10 determines whether the driving habit of the driver is "aggressive" requiring more frequent, faster and higher torque variations or whether the driver is "conservative" requiring less frequent, slower, and lower torque variations. This information can then be utilized to continuously adapt the controlling operation of the vehicle's powertrain to maximize fuel economy and reduce emissions. The system 10 periodically updates the torque request information supplied by the driver so that the system 10 can provide the most efficient mode of operation for the powertrain regardless of the type of driver or driving cycle.

Referring again to FIG. 1, during the operation of the automobile, the driver creates torque requests when actuating the control pedals such as the accelerator pedal or the brake pedal. Driver toque request data 12 is generated by the torque request and is received by the system 10. As shown in block 14, the torque request data 12 is accumulated over a period of time to yield accumulated torque request data. The accumulated torque request data may preferably include an accelerator and brake torque history 16 and the rate of change of torque (dT/dt) 18. In the embodiment shown, for example, the torque request data 12 is accumulated over a period of thirty seconds, although shorter or longer time periods may be used.

As shown in Block 20, relevant or significant torque data is extracted from the accumulated torque request data (i.e., the accelerator and brake torque history 16 and the rate of change of torque 18). In particular, as shown in Block 22, the running average of torque 26 and the rate of change of torque 26 are determined over a 30 second interval based on the accelerator and brake torque history 16 and the rate of change of torque 18. As shown in Block 24, a torque histogram is generated from the accelerator and brake torque history 16. The slope of the torque histogram 28 is determined from the torque histogram. The slope of the torque histogram is used as a significant determinant of the driving pattern of the driver based on the fact that a more aggressive driver typically will spend a larger fraction of driving time commanding higher torques. A real-time clock 30 is used for the torque data accumulation (Block 14) and the extraction of the relevant or significant data from that accumulated torque request data (Block 20). The clock 30 may preferably be any conventional clock.

The extracted information including the running average of the torque 26, the rate of change of torque 26, and the slope of the torque histogram 28 are received and processed by a driving pattern determination algorithm (see Block 32). The driving pattern determination algorithm "learns" from this information to determine the driving habit 34 of the particular driver in terms of degrees of aggression from very conservative to very aggressive. The algorithm itself is a set of "rules" or look-up tables that are empirically derived.

The driver habit data 34 generated by the driving pattern determination algorithm (Block 32) is stored within the system 10. It can be stored as a "preset" for a particular driver along with other driver settings such as seats, mirrors, radio stations, etc. The driving habit-related settings can therefore be adjusted to match the driving habits of a particular driver as soon as that driver inputs the driver identification 36 to identify himself/herself.

The driving habit data 34 is then supplied to an optimal powertrain fuel economy control algorithm, which combines the driving habit data 34 information with a second driver torque request data 46 to generate commands for the powertrain of the vehicle (see Block 38). In the case of a conventional powertrain, the optimal powertrain fuel economy control algorithm generates transmission commands 40 and engine commands 42. In particular, the algorithm determines the optimal gear for the transmission and the optimal speed and torque values for the engine.

In the case of a hybrid powertrain (i.e. a powertrain employing both engine power and battery power for motive force), the powertrain fuel economy control algorithm generates transmission commands 40, engine commands 42, and electric motor commands 44. In particular, the algorithm determines the optimal split between the engine and the electric drive, the optimal transmission shift schedule, the battery charging torque for the engine, and the engine on/off duration and hysteresis (i.e., the time delay introduced between the OFF to ON to OFF transitions for the engine). Additional inputs into the powertrain fuel economy control (Block 38) may preferably include the status of the battery 47 and the available torque for the electric motor (for a hybrid vehicle) 48 and available torque for the engine 49.

The system 10 described above may be implemented in a wide variety of vehicles. Such vehicles may include conventional vehicles as well as hybrid-electric vehicles, such as, for example, the General Motors-PNGV Parallel Hybrid Show/Demonstration vehicle.

Figure 2A:
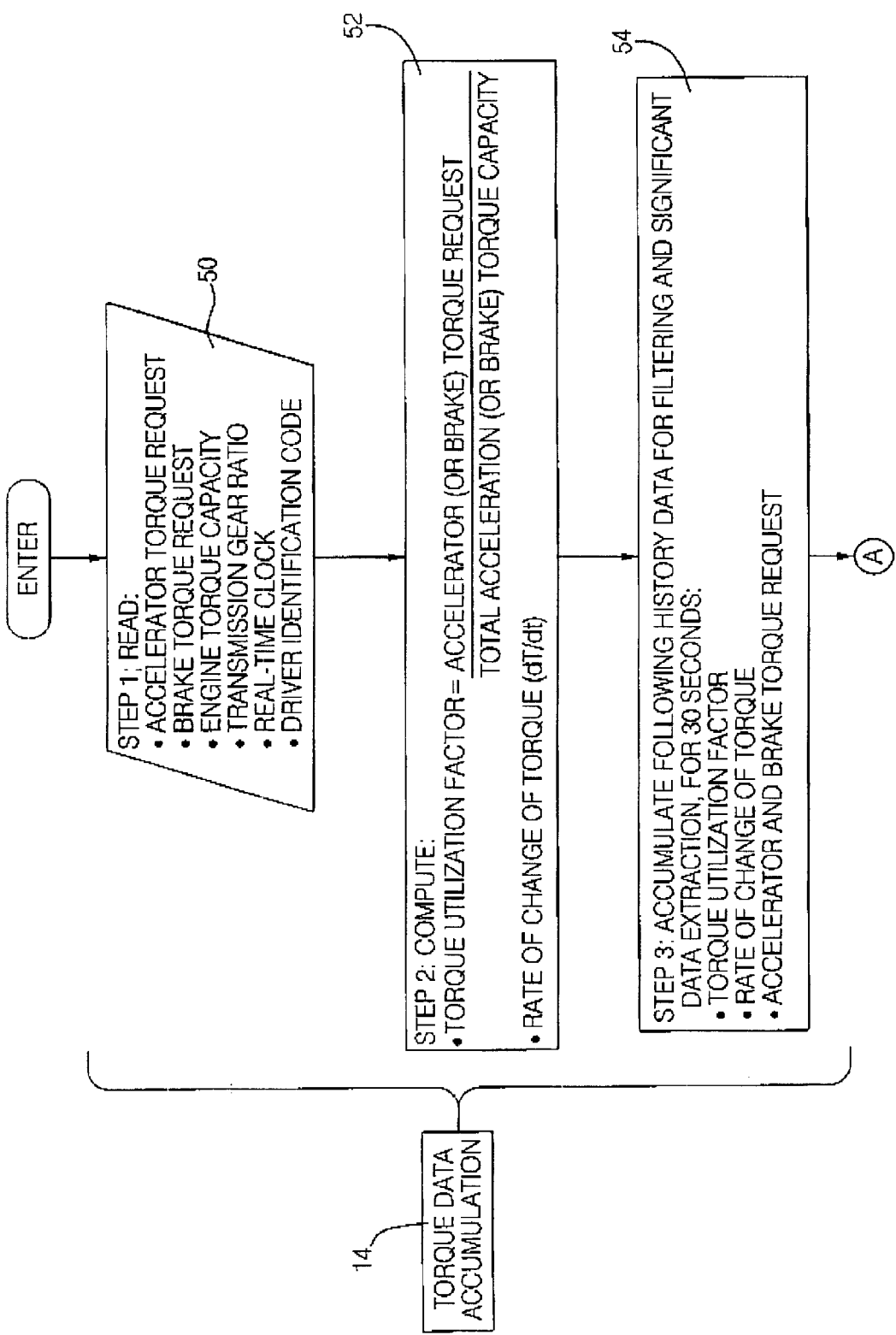
FIG. 2 is a flow chart of an embodiment of a routine for providing optimal fuel economy for a conventional automobile that is made in accordance with the invention.
Figure 2B:
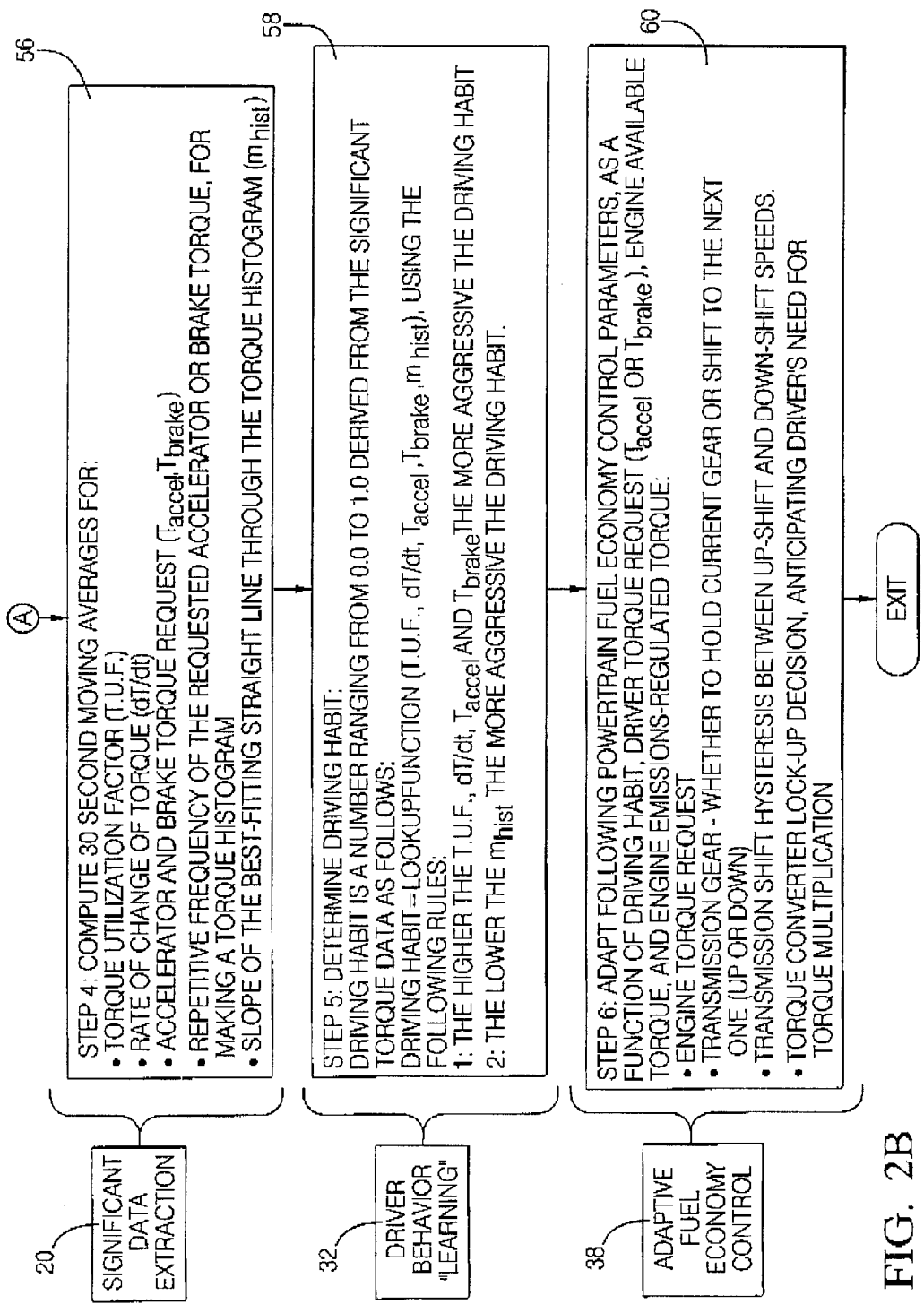

A flowchart illustrating one embodiment of a routine for providing optimal fuel economy for an automobile, and in particular, to a conventionally powered automobile having a manual or automatic transmission, is shown in FIG. 2. Reference is made to both FIG. 1 and FIG. 2 in the following description. Blocks 50, 52, and 54 show steps involved in accumulating the driver torque data. Referring to Block 50, the system 10 reads the accelerator torque requested by the driver and the brake torque requested by the driver. The system 10 also reads the engine torque capacity, the transmission gear ratio, the real-time clock 30, and the driver identification code 36. Referring to Block 52, the system 10 determines the torque utilization factor, which is derived by dividing the accelerator (or brake) torque request 12 by the total acceleration (or brake) torque capacity. The system 10 also computes the rate of change of torque (dT/dt) 18.

In Block 54, the system 10 accumulates history data relating to the torque utilization factor, the rate of change of torque, and the accelerator and brake torque request over a 30 second interval. It should be noted that the time interval may vary depending upon the particular application.

In Block 56, the relevant or significant torque data is extracted from the accumulated torque data. In particular, 30 second moving averages are determined for: (1) the torque utilization factor (T.U.F.), (2) the rate of change of torque (dT/dt), (3) the accelerator and brake torque request ($T_{accel}, T_{brake}$), (4) the repetitive frequency of the requested accelerator or brake torque, for making a torque histogram, and (5) the slope of the best-fitting straight line through the torque histogram ($m_{hist}$).

In Block 58, the driving habit for the particular driver is determined. The driving habit is a number ranging from 0.0 to 1.0, which is derived from the significant torque data as follows:

Driving habit=Lookupfunction ($T.U.F., dT/dt, T_{accel}, T_{brake}, m_{hist}$), using the following rules:
1. The higher the T.U.F., dT/dt, $T_{accel}$, $T_{brake}$, $m_{hist}$, the more aggressive the driving habit.
2. The lower the absolute value of $m_{hist}$, the more aggressive the driving habit.

In Block 60, the powertrain fuel economy control parameters are adjusted as a function of the driving habit 34, the driver torque request ($T_{accel}$ or $T_{brake}$), the torque available to the engine, and the engine emissions-regulated torque to provide the optimal fuel economy for the particular driving habit. For example, the engine torque request may be adjusted. Similarly, the transmission gear may be adjusted up or down, or may stay the same. The transmission shift hysteresis between up-shift and down-shift speeds may also be adjusted. Finally, the torque converter lock-up decision may be adapted to anticipate the driver's need for torque multiplication.

Figure 3A:
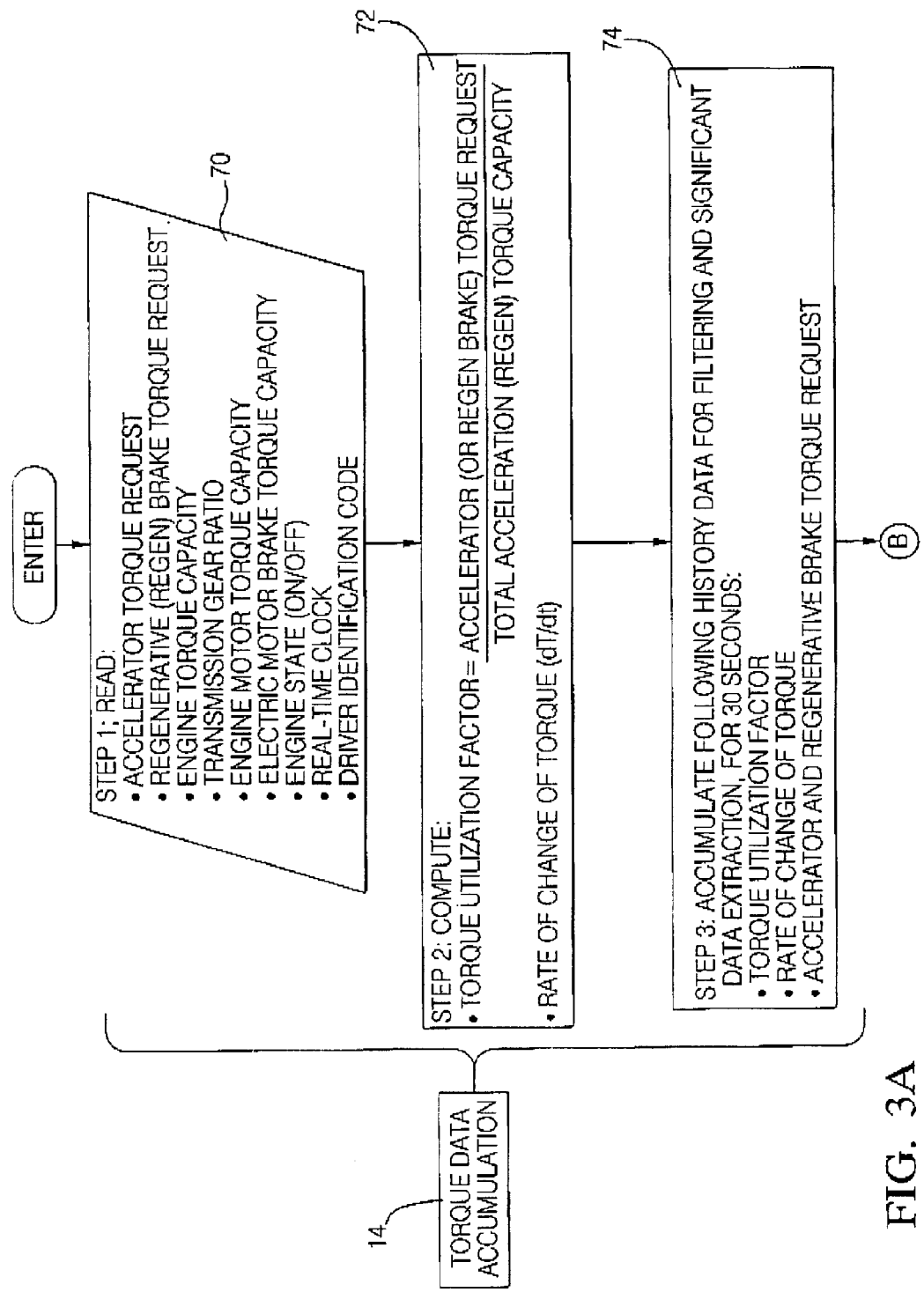
FIG. 3 is a flow chart of an embodiment of a routine for providing optimal fuel economy for a hybrid automobile that is made in accordance with the invention.
Figure 3B:
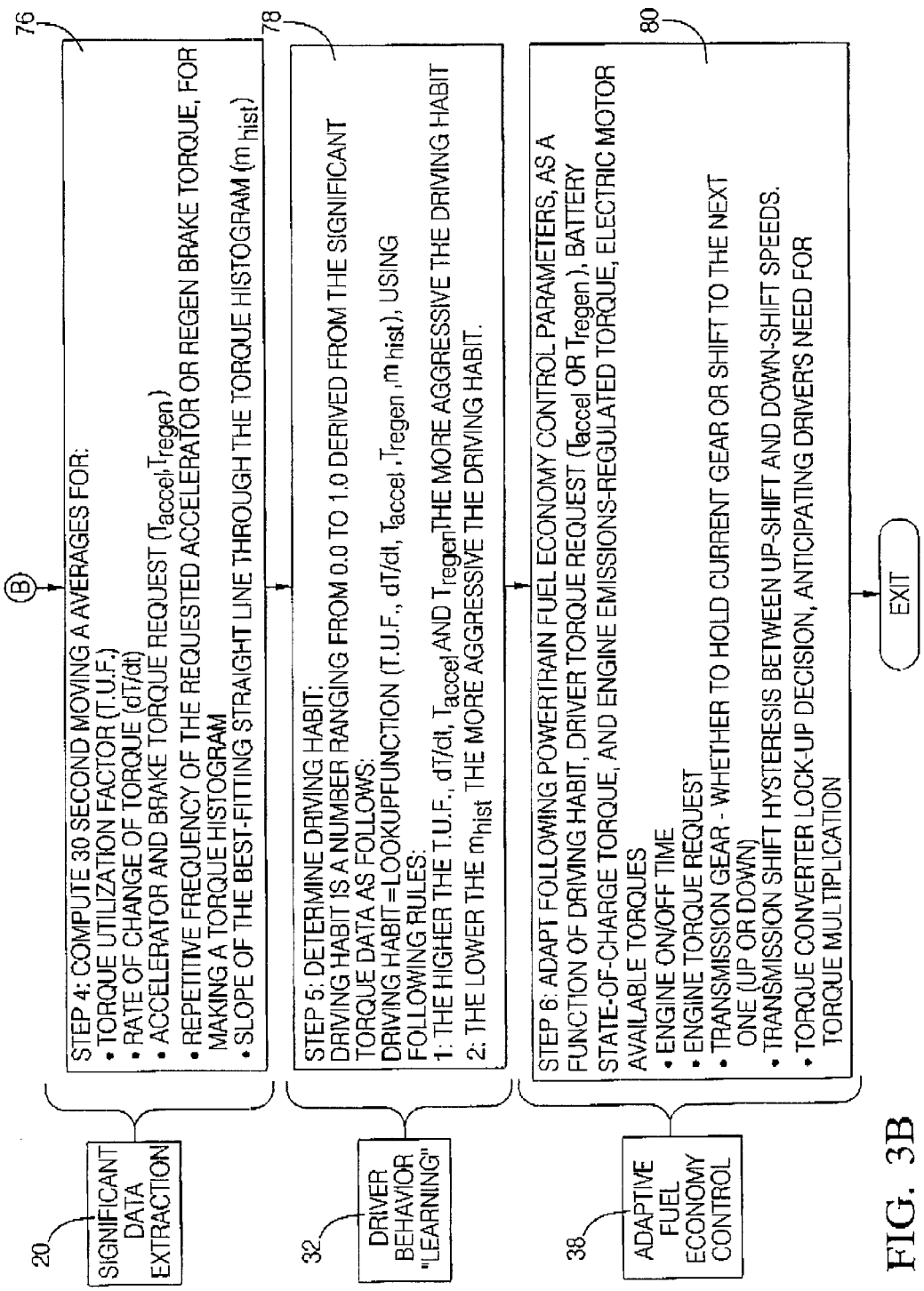

A flowchart illustrating one embodiment of a routine for providing optimal fuel economy for a hybrid vehicle with an automatically shifted manual transmission or an electrically variable transmission (EVT) is shown in FIG. 3. Reference is made to both FIG. 1 and FIG. 3 in the following description. Blocks 70, 72, and 74 show the steps involved in accumulating the driver torque data. Referring to block 70, the system 10 reads the accelerator torque requested by the driver and the regenerative ("regen") brake torque requested by the driver. The system 10 also reads the engine torque capacity, the transmission gear ratio, the electric motor torque capacity, the electric motor brake torque capacity, the engine state (on/off), the real-time clock, and the driver identification code.

Referring to Block 72, the system 10 determines the torque utilization factor, which is derived by dividing the accelerator (or regen brake) torque request by the total acceleration (or regen brake) torque capacity. The system 10 also computes the rate of change of torque (dT/dt).

Referring to Block 74, the system 10 accumulates history data relating to the torque utilization factor, the rate of change of torque, and the accelerator and regenerative brake torque request over a 30 second interval. It should be noted that the time interval may vary depending upon the particular application.

Referring to Block 76, the relevant or significant torque data is extracted from the accumulated torque data. In particular, 30 second moving averages are determined for: (1) the torque utilization factor (T.U.F.), (2) the rate of change of torque (dT/dt), (3) the accelerator and regenerative brake torque request ($T_{accel}, T_{regen}$), (4) the repetitive frequency of the requested accelerator or regenerative brake torque, for making a torque histogram, and (5) the slope of the best-fitting straight line through the torque histogram ($m_{hist}$).

In Block 78, the driving habit for the particular driver is determined. The driving habit is a number ranging from 0.0 to 1.0, which is derived from the significant torque data as follows:

Driving habit=Lookupfunction ($T.U.F., dT/dt, T_{accel}, T_{regen}, m_{hist}$), using the following rules:
1. The higher the T.U.F., dT/dt, $T_{accel}$, $T_{regen}$, $m_{hist}$, the more aggressive the driving habit.
2. The lower the absolute value of $m_{hist}$, the more aggressive the driving habit.

In Block 80, the powertrain fuel economy control parameters are adjusted as a function of the driving habit, the driver torque request ($T_{accel}$ or $T_{regen}$, the battery state of charge, i.e. the amount of energy available as a fraction of total capacity, the torque available from the engine, the engine emissions-regulated torque, and torque available from the electric motor(s) to provide the optimal fuel economy for the particular driving habit. For example, engine on/off time may be adjusted. Also, the engine torque request may be adjusted. Similarly, the transmission shift points may be adjusted. Finally, the electric motor torque request and the battery charging torque request may be adjusted.

Figure 4A:
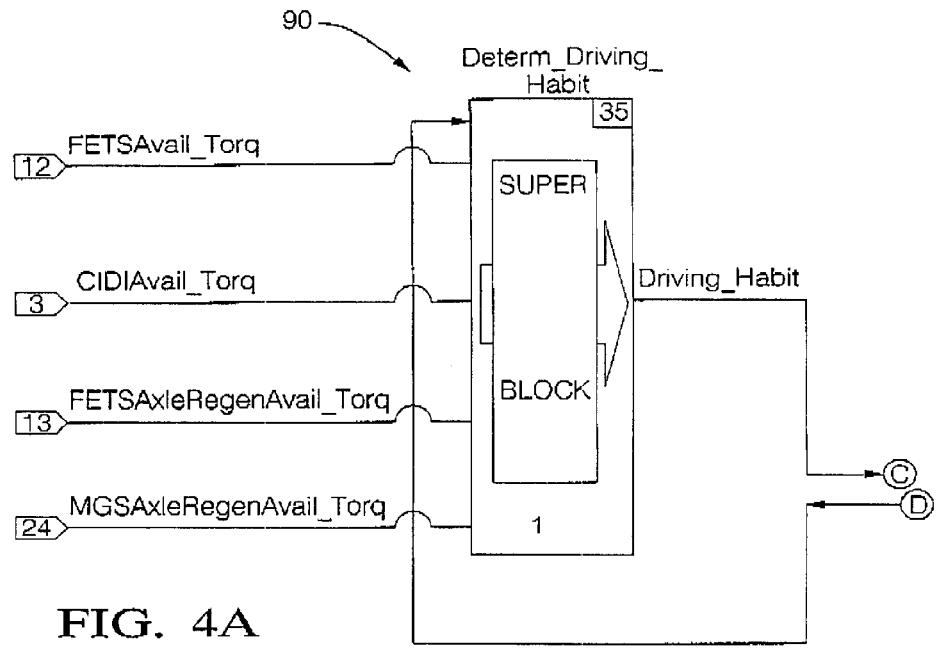
FIG. 4 is a block diagram illustrating an example of software structure for carrying out a driver habit determination algorithm and a powertrain fuel economy control algorithm for a hybrid-electric automobile.
Figure 4B:
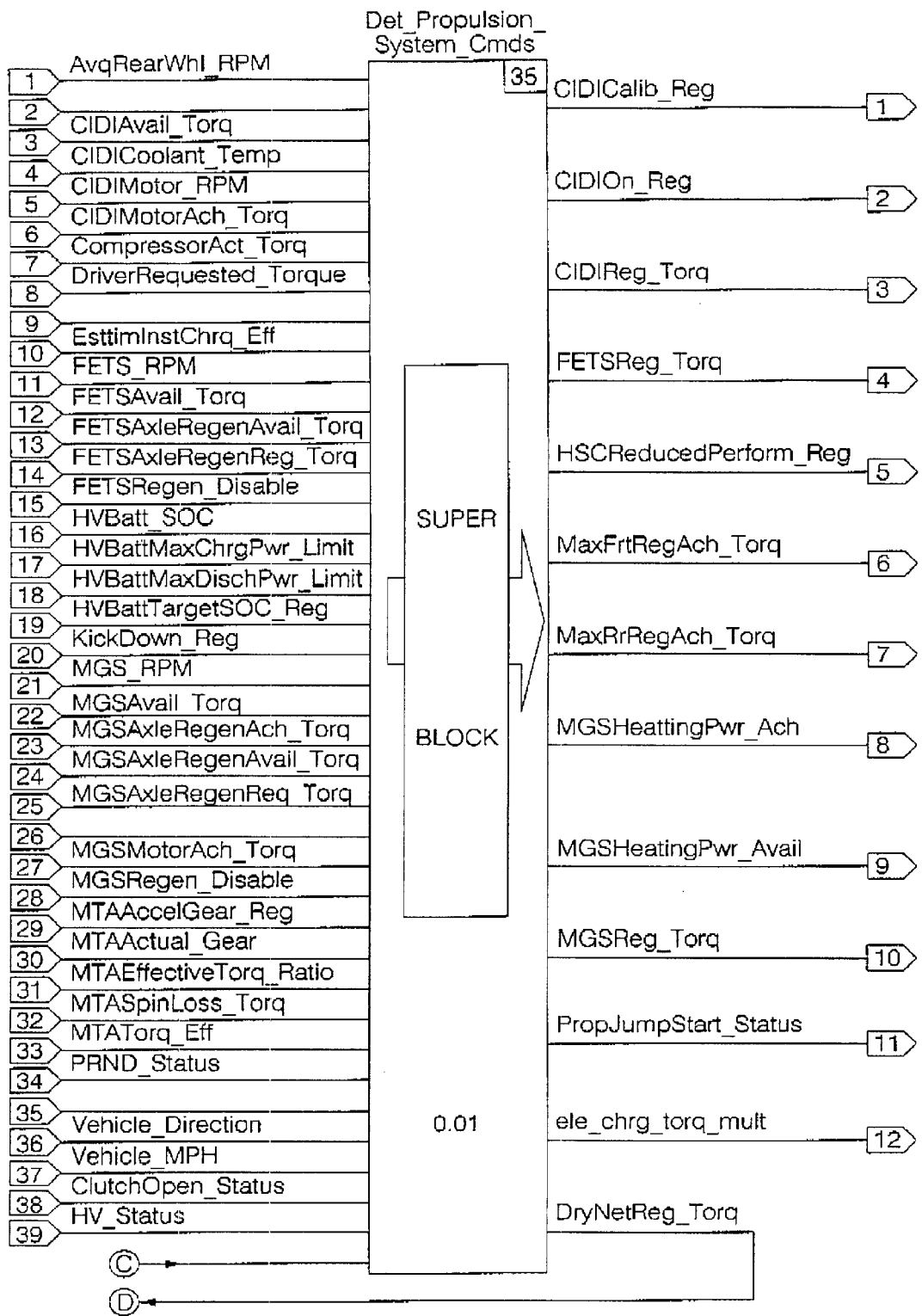

FIG. 4 is a block diagram illustrating an example of software structure used for carrying out a driver habit determination algorithm (see reference numeral 90) that supplies driving habit data to a powertrain fuel economy control algorithm (see reference numeral 92) for a hybrid-electric automobile. The powertrain fuel economy control algorithm 92 may adjust various powertrain control parameters based on the driving habit data such as, for example, engine and electric motor torque requests, battery charge power, and engine On/Off duration. The software structure shown in FIG. 4 may preferably be converted to C-code, and then compiled and downloaded into a any conventional controller such as, for, example, a Motorola PowerPC MPC8240-based real time controller for installation into the vehicle.

Figure 5:
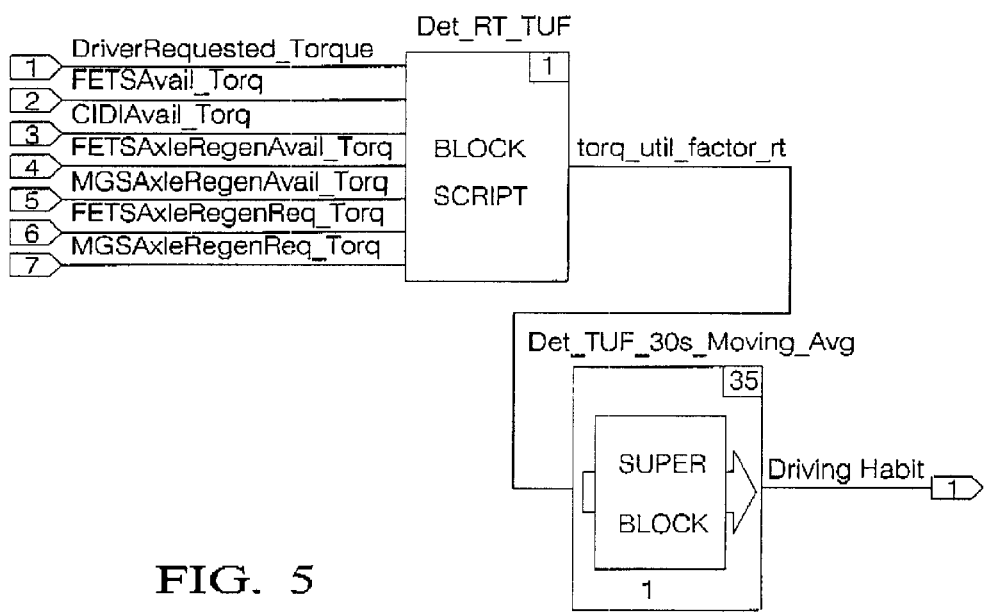
FIG. 5 is a block diagram illustrating in greater detail the software structure for the driver habit determination algorithm shown in FIG. 4.
Figure 6:
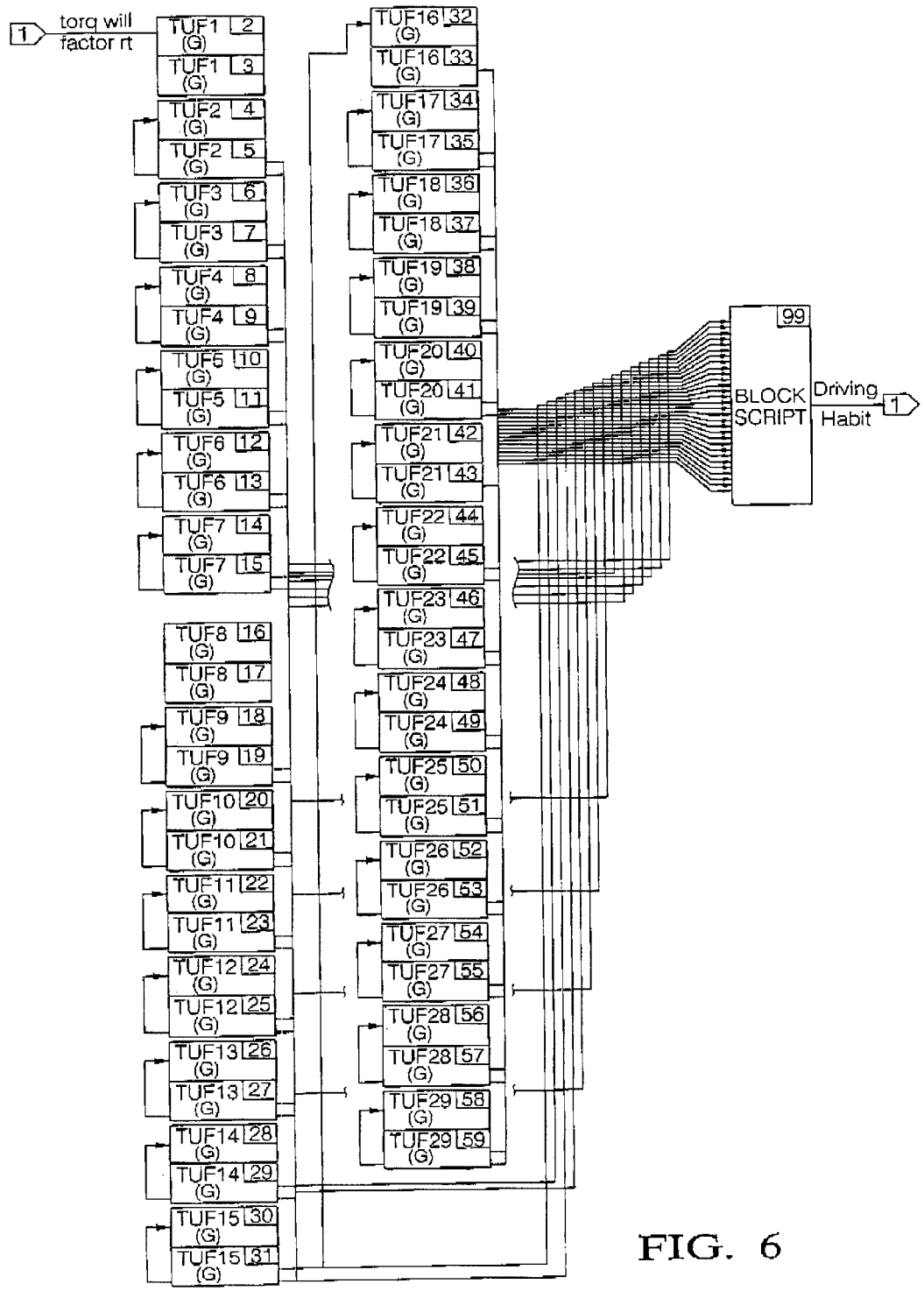
FIG. 6 is a block diagram illustrating in even further detail the software structure for the driver habit determination algorithm shown in FIG. 4.

FIG. 5 is a block diagram illustrating in greater detail the software structure for the driver habit determination algorithm 90 shown in FIG. 4. Similarly, FIG. 6 is a block diagram illustrating in even further detail the software structure for the driver habit determination algorithm 90 shown in FIG. 4.

One advantage of the system 10 described above is that it automatically adjusts the operation of the powertrain based on the specific driving habits of a particular driver to maximize fuel economy. The increase in fuel economy in turn results in a decreased emissions (i.e., the less fuel burnt the less exhaust produced). The improvement in fuel economy is accomplished without the need for any additional hardware parts and associated warranties, which add significant costs to the vehicle. The system 10 provides increased fuel economy without the use of expensive light-weight materials, more efficient engines, or improved catalytic converters.

Moreover, because of the increased fuel efficiency that results from the system 10, the fuel economy for a particular vehicle will be less dependent upon various fuel economy regulations as compared to the fuel economy of competitive vehicles. For example, the system 10 will make it easier for a manufacturer to meet the Corporate Average Fuel Economy (C.A.F.E.) standard. In addition, a particular vehicle's fuel economy will be less dependent on any given EPA test schedule as compared to fuel economy of competitive vehicles. For example, if the EPA decides to change a test schedule for an automobile, the system 10 will automatically adjust to the new test schedule to provide the highest possible fuel economy for that particular test schedule. This results in cost savings to a manufacturer for not having to re-calibrate the engines and transmissions for new test schedules.

The system 10 also provides real fuel cost savings to consumers because of the relatively higher fuel economy than other competitive vehicles irrespective of driving habits and patterns. The system's ability to "learn" a driver's particular driving behavior and to automatically adjust the powertrain accordingly to maximize fuel economy may also provide an additional "sales" feature for marketing the vehicle to provide a competitive advantage.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein

We claim:

1. A method of optimizing fuel economy for an automobile comprising the steps of:
   receiving driver torque request input data;
   accumulating the driver torque request input data to generate accumulated torque request data;
   extracting torque data from the accumulated torque request data;
   processing the torque data to generate driver habit data from the torque data; and
   storing the driver habit data.

2. The method of claim 1 further comprising the steps of:
   receiving a second driver torque request input data; and
   combining the driver habit data with the second driver torque input data to generate powertrain commands to optimize fuel economy.

3. The method of claim 1 wherein the driver torque request input data includes accelerator and brake torque request data.

4. The method of claim 1 further comprising the step of:
   determining an accelerator and brake torque request history.

5. The method of claim 1 further comprising the step of:
   determining a rate of change of torque.

6. The method of claim 1 wherein the driver torque request input data is accumulated over a period of thirty seconds.

7. The method of claim 1 further comprising the step of:
   determining a running average of torque.

8. The method of claim 1 further comprising the step of:
   generating a torque histogram.

9. The method of claim 8 further comprising the step of:
   determining a slope of the torque histogram.

10. The method of claim 1 further comprising the step of:
    storing the habit data as a preset for a particular driver.

11. The method of claim 1 further comprising the step of:
    receiving a driver identification.

12. The method of claim 2 wherein the powertrain commands include transmission commands and engine commands.

13. The method of claim 2 wherein the powertrain commands include transmission commands, engine commands, and electric motor commands.

14. The method of claim 2 further comprising the steps of:
    providing a transmission including a plurality of gears; and
    determining an optimal gear from the plurality of gears for the transmission.

15. The method of claim 2 further comprising the steps of:
    providing an engine; and
    determining an optimal torque for the engine.

16. The method of claim 2 further comprising the steps of:
    providing an engine and an electric drive;
    determining an optimal torque for the engine;
    determining an optimal torque for the electric drive;
    determining an optimal shift schedule;
    determining a battery charging torque for the engine; and
    determining On/Off times for the engine.

17. The method of claim 1 further comprising the step of:
    depressing an accelerator pedal to create the driver torque request input data.

18. The method of claim 1 further comprising the step of:
    depressing a brake pedal to create the driver torque request input data.

19. The method of claim 2 further comprising the step of:
    depressing an accelerator pedal to create the second driver torque request input data.

20. The method of claim 2 further comprising the step of:
    depressing a brake pedal to create the second driver torque request input data.

21. A system for optimizing fuel economy of an automobile comprising a computer readable medium having stored thereon computer readable program code, the computer readable program code further comprising:

computer readable program code that receives driver torque request input data;

computer readable program code that accumulates the driver torque request input data to generate accumulated torque request data;

computer readable program code that extracts torque data from the accumulated torque request data; and computer readable program code that processes the torque data to generate driver habit data from the torque data.

22. The system of claim 21 further comprising:

computer readable program code that receives a second driver torque request input data; and computer readable program code that combines the driver habit data with the second driver torque request input data to generate powertrain commands to optimize fuel economy.

23. A program for optimizing fuel economy of an automobile comprising:

computer readable program code that receives driver torque request input data;

computer readable program code that accumulates the driver torque request input data to generate accumulated torque request data;

computer readable program code that extracts torque data from the accumulated torque request data;

computer readable program code that processes the torque data to generate driver habit data from the torque data; and computer readable program code that stores the driver habit data.

24. The program of claim 23 further comprising:

computer readable program code computer readable program code that receives a second driver torque request input data; and computer readable program code that combines the driver habit data with the second driver torque request input data to generate powertrain commands to optimize fuel economy.

* * * * *